W. N. GOODWIN, Jr.
THERMAL AMMETER.
APPLICATION FILED JULY 27, 1916.

1,407,147.

Patented Feb. 21, 1922.
5 SHEETS—SHEET 1.

Inventor
William N. Goodwin Jr.

By Byrnes Townsend & Brickenstein
Attorneys

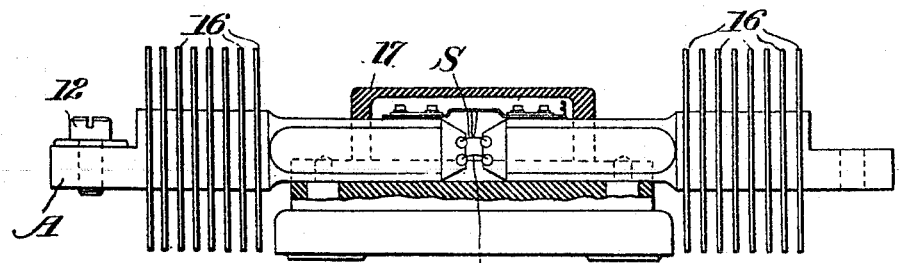
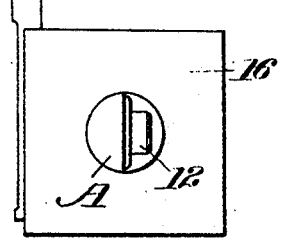
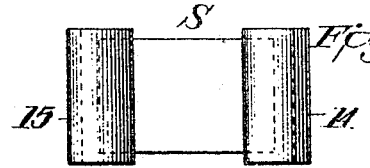
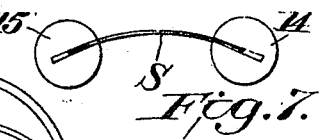
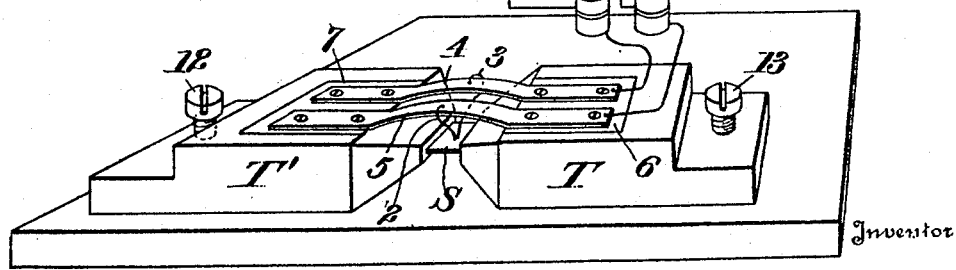

W. N. GOODWIN, JR.
THERMAL AMMETER.
APPLICATION FILED JULY 27, 1916.

1,407,147.

Patented Feb. 21, 1922.
5 SHEETS—SHEET 3.

Inventor
William N. Goodwin, Jr.
By Byrnes Townsend Brickenstein
Attorneys

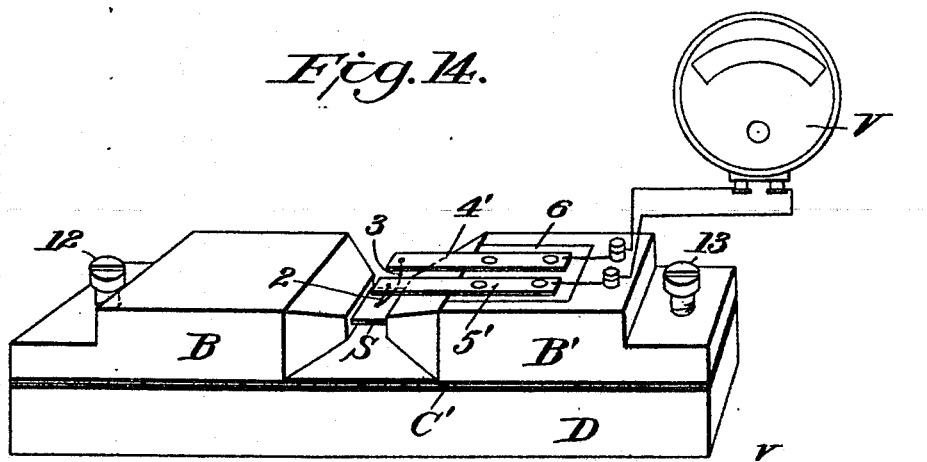
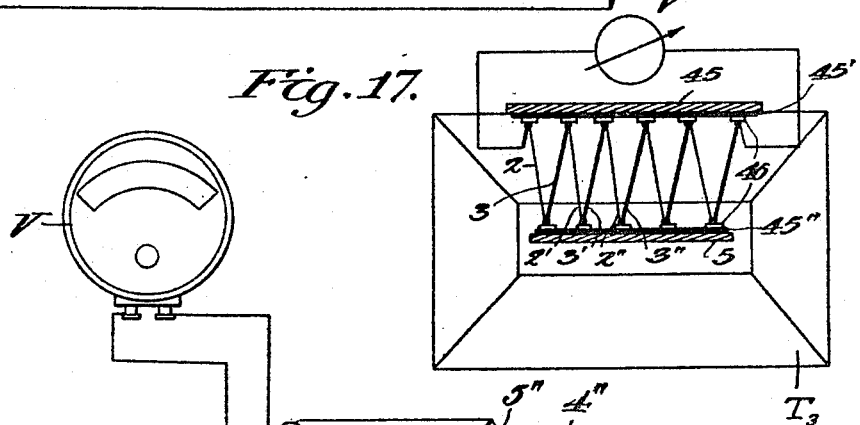
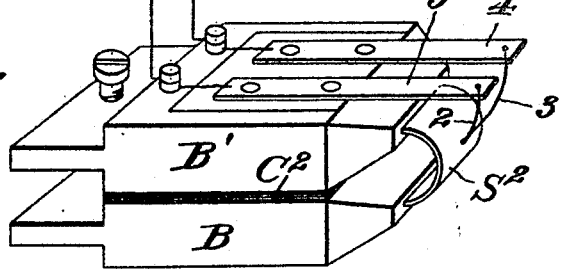
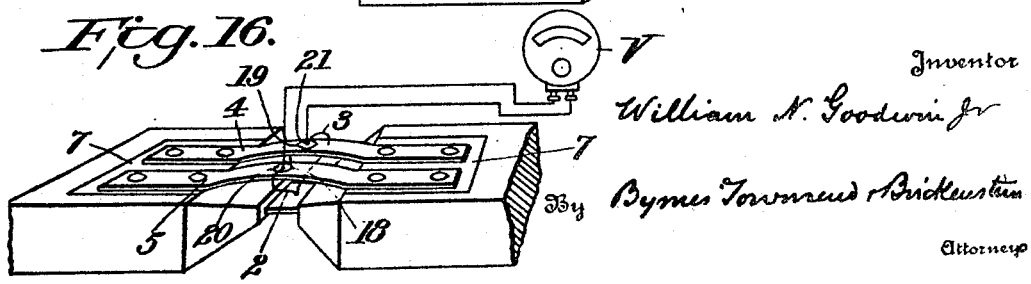

W. N. GOODWIN, Jr.
THERMAL AMMETER.
APPLICATION FILED JULY 27, 1916.

1,407,147.   Patented Feb. 21, 1922.
5 SHEETS—SHEET 5.

Inventor
William N. Goodwin Jr.
By Byrnes Townsend Bickart Attorneys

UNITED STATES PATENT OFFICE.

WILLIAM NELSON GOODWIN, JR., OF NEWARK, NEW JERSEY, ASSIGNOR TO WESTON ELECTRICAL INSTRUMENT COMPANY, OF NEWARK, NEW JERSEY, A CORPORATION OF NEW JERSEY.

THERMAL AMMETER.

1,407,147.  Specification of Letters Patent.  Patented Feb. 21, 1922.

Application filed July 27, 1916. Serial No. 111,737.

*To all whom it may concern:*

Be it known that I, WILLIAM NELSON GOODWIN, Jr., a citizen of the United States, residing at Newark, in the county of Essex and State of New Jersey, have invented certain new and useful Improvements in Thermal Ammeters, of which the following is a specification.

My invention relates to a thermal-ammeter for the measurement of alternating currents of any frequency, but intended especially for measurement of currents of the very high frequency met with in wireless telegraphy and other oscillating circuits.

The invention consists in an apparatus embodying a new method of measuring current thermally, viz., measuring the current passing through a conductor, or "hot wire," connected to terminals, by the difference in the temperatures (produced by the passage of the current) between the mid-portion, preferably the centre and ends of the conductor, the conditions being so controlled that this temperature difference will be dependent principally upon the thermal and electrical conductivities of the material of which the heating conductor is made, and only to a slight extent upon external or other influences.

The invention further relates to means by which such possible errors of indication are corrected or compensated.

The construction of the instrument and its mode of operation will be understood from the accompanying specification and drawings.

Figure 1:
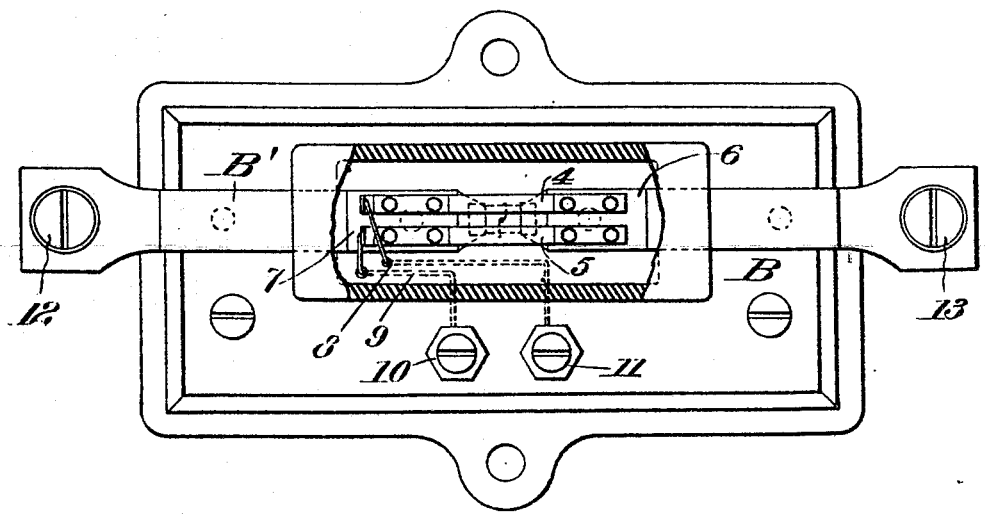
Figure 2:
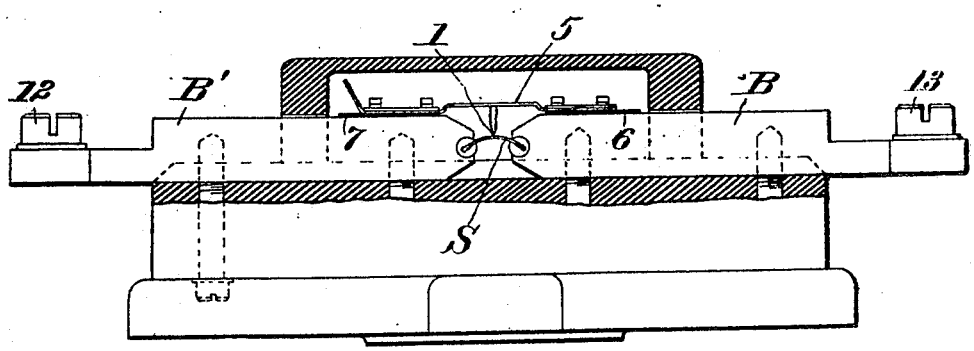
Figure 3:
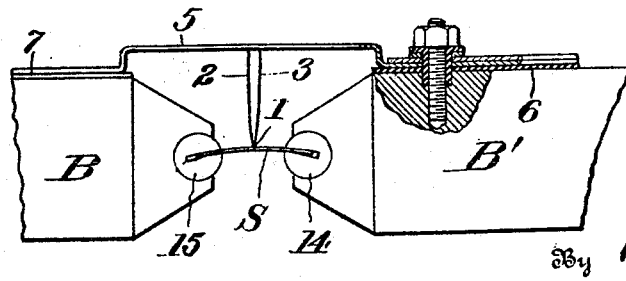
Figure 18:
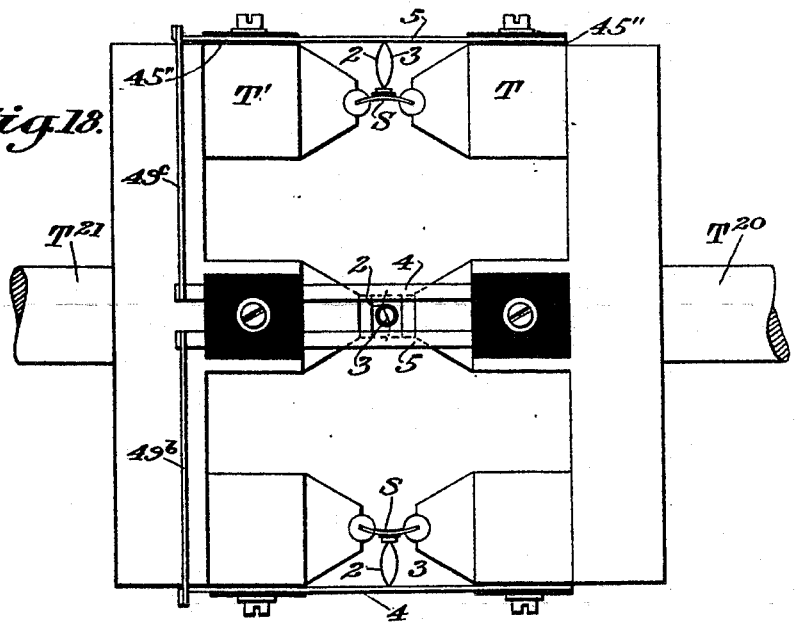
Figure 19:
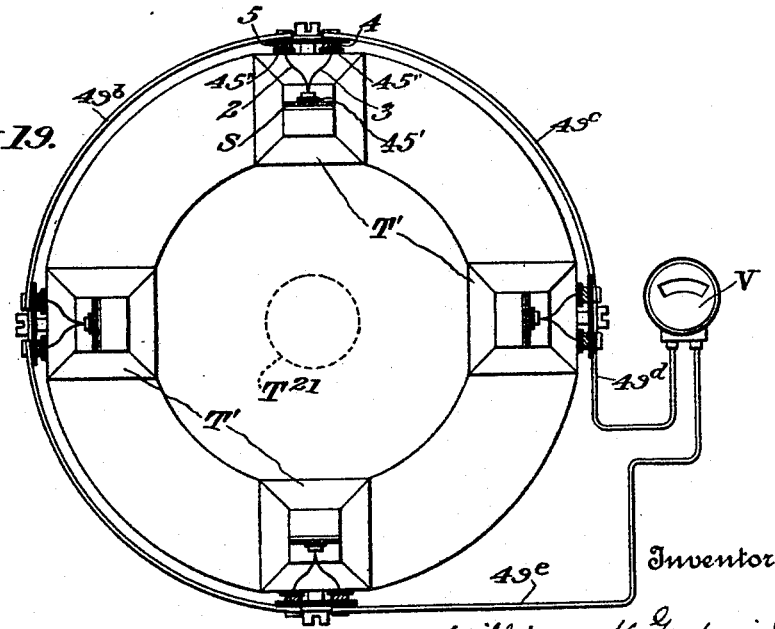

Fig. 1 is an elevation of the instrument;
Fig. 2 is a part section of Fig. 1;
Fig. 3 is a plan view on a larger scale;
Fig. 4 is a plan view showing a modification;
Fig. 5 is an end view of Fig. 4;
Fig. 6 is an elevation of the heating element, of Fig. 1, on an enlarged scale;
Fig. 7 is a plan of Fig. 6;
Fig. 8 is a diagrammatic perspective view of the instrument and milli-volt meter.
Figs. 9, 10, 11, 12, and 13 are illustrative diagrams;
Fig. 14 illustrates a modification;
Fig. 15 illustrates still another modification;
Fig. 16 illustrates a modification in the thermo-couple connections.
Fig. 17 is a sectional view of a modification showing a plurality of thermo-couples in series.
Figs. 18 and 19 are an elevation and a sectional view, respectively, showing a further modification.

Referring to Figs. 1 and 2 which represent in full size one type of instrument, S is the resistor strip made preferably of a platinum alloy, welded, hard soldered or otherwise permanently secured to the two terminals B, B'. In practice it is exceedingly difficult to make a good electrical and good thermal junction between the thin resistor strip or heating strip S and the massive terminals B, B' by ordinary methods and means. In order to provide a connection which satisfies the thermal and electrical requirements the heating strip S may be permanently secured to the terminals by inserting the ends of the strip into slits in bars 14, 15, which are preferably cylindrical and more massive than the strip. These bars may be slitted as in Fig. 7. After the ends of the strips have been coated with silver solder and inserted into the slits the parts of the rods are compressed to firmly clamp the ends of the strips and the parts are then heated to insure a thorough soldering or welding of the strip into the bars. The bars 14, 15 are then soldered or welded into place in the ends of the terminals B, B'. The soldering insures good thermal and electrical connection and may be effected either by hard soldering or by autogenous soldering, the term solder being used in the claims to cover either method. The strip S is preferably slightly curved in order to provide for expansion under heat. The "hot" junction of a thermo-couple, is thermally connected, i. e. either in close juxtaposition or in actual connection with the strip S at or near its central portion 1. Preferably, it is welded or hard soldered to the heating wire or strip. The "cold" ends of the wires 2 and 3 of the thermo-couple are soldered to the two copper or other metallic compensating strips 4 and 5 which bridge across the two terminals, preferably bent as shown to allow for expansion and contraction. The strips are electrically insulated from the terminals by thin plates 6 and 7 of mica or other insulation which has a fairly good thermal conductivity and have such an area in contact with the terminals that the ends of the compensating strips soon acquire the same temperature as the corresponding terminals. Binding posts 12 and 13 are provided for each terminal and binding posts 10 and 11 are connected by suitable wires 8 and 9 to the compensating strips 4 and 5. As shown in Fig. 4 the terminals may if desired be provided with cooling plates 16 which may be of any suitable shape. Instead of using a single heating strip, two strips S and S' may be used, the "hot" end of the thermo-couple being secured to one of the strips, preferably the outer strip S.

17 is the box arranged to surround and inclose the heating strip and its connections.

V is a milli-volt meter connected by suitable wires to the terminals 10 and 11.

In the particular instrument illustrated in Fig. 1, used for a range of 40 amperes, the heating-wire or strip is made of platinum alloy and is 0.200 in. long, 0.200 in. wide and 0.0034 in. thick. The wires of the thermo-couple are respectively of platinum-iridium alloy, and a nickel-copper alloy, but may be made of any other suitable metals, as long as they are inoxidisable at the maximum working temperature, and are preferably made of very thin wires, which because they are short can have relatively low electrical resistance, and because they are very thin are of small mass and therefore have very small heat capacity, which is of importance in order to obtain quickly responsive indications. The heat capacity of the whole thermo-electrical system is thus exceedingly small, and is rapidly heated when the current passes and rapidly cooled on its cessation.

The heating-wire or strip S, is made as far as practicable of uniform cross-sectional area and is preferably short, for reasons more fully explained hereafter. The compensating metallic strips 4 and 5 which form the "cold-end" of the thermo-couple are so designed as to thermal conductivity, length, cross-section and superficial area as to be thermally equivalent to the heating strip S. They may be made of the same material as the heating-strip and may then be made of exactly the same form and size as the heating-strip; or they may more conveniently be made of cheaper material, such as copper, in which case they are designed, with reference to the above mentioned factors, to be thermally equivalent to the heating-strip as hereinafter explained.

A thorough understanding of the underlying principles of this thermal-ammeter is probably best obtained by considering it historically.

Figure 9:
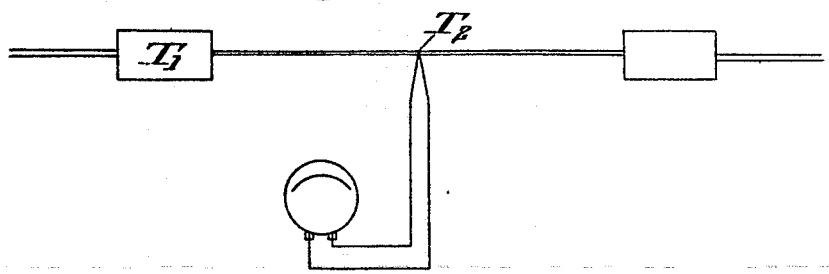

The simplest form of thermal-ammeter is one in which the current to be measured is passed through a wire or strip, to the centre of which is secured in thermal contact a thermo-electric junction either by soldering or otherwise as shown in Figure 9. The other end of the couple is connected to the binding posts of an indicating instrument of the D. C. type.

The passage of the current heats the wire to a temperature depending upon the equilibrium established between the heat furnished, and upon the amount of heat carried away by convection, by radiation, and by conduction to the terminals. The latter is a variable quantity since it depends upon the temperature of the terminals which is influenced by the time the current has been passing. In order, therefore, that the temperature of the wire or strip in this form of instrument shall be determined by the temperature of the surrounding air, which is assumed as the basis, and not upon the variable temperature of the terminals, it is necessary that the amount of heat conducted through the strip to the terminals shall be negligible in comparison to the amount dissipated by convection and radiation. This is accomplished by making the wire or strip long in comparison to its cross section, or more accurately stated, of large superficial area relative to the cross sectional area.

The instrument indication depends upon the difference in temperature between the hot and cold ends of the couple, that is, between the heated wire and the binding posts of the instrument which are assumed to be at the temperature of the surrounding air.

From these considerations, it is obvious that the heated wire and the instrument in this simple form of thermo-ammeter must be both out in the open air, or both enclosed in the same chamber, for the reason that both the hot and cold ends of the couple must be subject to the same air temperature in order that the difference in temperature between them and consequently the thermo-electromotive force generated may be at all times dependent only upon the heating produced by the current. When any change occurs in the temperature of the air, the change affects the heated wire, before it does the temperature of the instrument, which determines the temperature of the cold end of the couple, on account of the great difference between the mass of the wire and that of the instrument. This introduces a lag error.

Further, on account of the great length of strip relative to the cross section, the drop in potential, and consequently the heat generated is relatively large in this form of thermal-ammeter, therefore, a large cooling surface in the instrument is required to dissipate the heat as the current range increases.

The development of the present form of thermal-ammeter is based upon the principle, as demonstrated by mathematical analysis, that if a conducting strip or wire of uniform cross sectional area, carrying a current, is cooled only by conduction through the body of the strip itself and not directly cooled by the surrounding air, the difference in temperature between any two points along the strip, in general; or, in particular, between the centre of the strip and the terminals to which the strip is joined, is dependent upon the difference of electrical potential between these points and upon the thermal and electrical conductivities of the material of which the conducting strip is made. The relation between these four quantities as found, is exhibited in the following equation.

$$T = \frac{v^2}{8k\rho}$$

Where
$T=$ temperature difference between centre of strip and terminal,
$v=$ difference of potential between the terminals.
$k=$ thermal conductivity of strip material, and
$\rho=$ specific resistance of the strip material.

Figure 10:
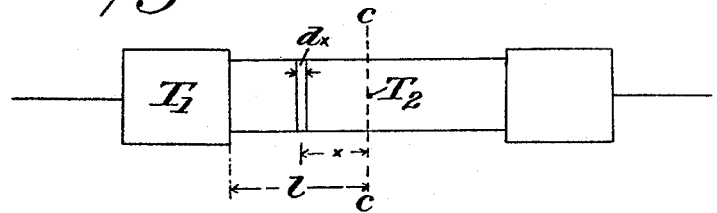
Figure 11:
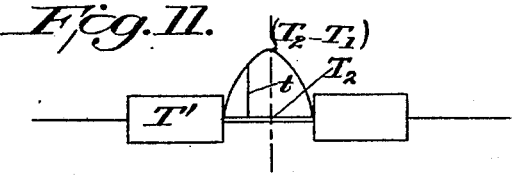

This is derived as follows,
Referring to Fig. 10, let $w=$ number of watts generated per unit length of strip.
Then the power consumed and transformed into heat in length $x$ measured from the centre $= wx$.
The heat thus produced from symmetry, all passes through the element $dx$, and produces across $dx$ the drop in temperature of $dt$.
From the law of the conduction of heat we have $$wx = -ak\frac{dt}{dx}$$

where
$a=$ cross sectional area of strip, and
$k=$ thermal conductivity of strip
then $$t = -\frac{w}{ak}\int x\,dx = -\frac{wx^2}{2ak} + C_1$$

To determine the constant of integration $C_1$; $t=T_1$, when $x=1$, then $$C_1 = T_1 + \frac{wl^2}{2ak}$$

or (1) $\quad t = \frac{w}{2ak}(l^2 - x^2) + T_1$

At the centre of the strip $x=0$, and $$t = T_2 = \frac{wl^2}{2ak} + T_1$$

or the difference in temperature between the centre of the strip and the terminal is $$T_2 - T_1 = \frac{wl^2}{2ak}$$

Since $$v = \frac{2Il\rho}{a} \text{ and } w = \frac{Iv}{2l}$$

the temperature equation can be changed as follows:

(2) $\quad T_2 - T_1 = \frac{v^2}{8k\rho} = T$ where $v=$ voltage drop across strip due to current $I$ and $\rho$ is the specific resistance of the strip.

This shows that the temperature difference between the centre and terminals under the assumed conditions, for any difference of potential, $v$, between the terminals, is proportional to the ratio of the electrical to the thermal conductivities, and to the square of the voltage drop, and consequently to the square of the current producing it. The temperature difference is therefore a measure of the root mean square of the current. The distribution of temperature along the strip is parabolic as shown by equation (1), and is graphically shown in Fig. 11.

In the practical case, these assumed conditions are not exactly fulfilled for the reason (1) that the electrical and thermal conductivities are not strictly constant for all temperatures, and (2) that some of the heat is carried away by convection into the air.

Figure 12:
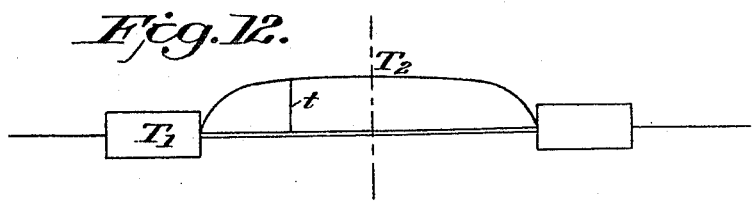
Figure 13:
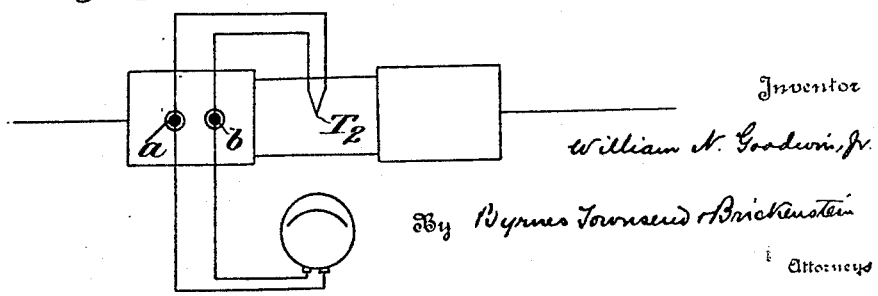

The latter produces a flattening of the curve, and for very long strips, results in practically constant temperature throughout the strip except near the terminals where most of the heat is dissipated by conduction to the terminals. This is illustrated in Fig. 12 and is considered analytically hereafter in the description of the compensation feature. From these considerations it is apparent that there is presented a new method of measuring current thermally, namely by the drop in temperature which takes place in a conductor carrying the current to be measured, due to its thermal resistance, so that if we have the conditions as demanded by the theory given above, that is, no heat lost by convection to the air, and equality of terminal temperatures, the current can be measured by placing the hot end of the couple at the centre of the strip, and the cold end in thermal contact with one of the terminals but electrically insulated from it, as shown in Fig. 13. The cold end would consist of the two junctions $a$ and $b$ each joined to a wire leading to the indicating instrument, both leading wires being made of the same material, such as copper, in order that the cold end shall be at the terminal instead of at the instrument. It is obvious that the junction $a$ may be on one terminal, and $b$ on the other, or that "$a$" and "$b$" may together be placed in thermal contact with any part of the heating strip itself which is cooler than the part in contact with the hot end of the thermocouple.

These theoretically perfect conditions, however, cannot be attained in practice, but they may be approximated by making the conducting strip of small superficial area in comparison to its cross sectional area, which in practice is obtained by making the strip so short that only a small proportion of the heat is lost directly from the strip by convection and radiation. Thus in the heating strip whose dimensions were given above, about 90% of the heat generated is conducted through the strip itself to the terminals.

The use of such a strip results in quick responsiveness of its temperature to current changes in it, and as a consequence, a corresponding responsiveness in the indications of the instrument connected to the thermo electric couple.

The term "short" is used in the claims not merely to indicate linear dimensions but to characterize a conductor of any form heated by the current which has such a cross sectional area in comparison to the superficial area that the quantity of heat carried to the terminals by conduction through the conductor is sufficiently large in proportion to that dissipated by radiation and convection, that the difference in temperature between a hotter portion of the conductor and the terminals sufficiently corresponds with the strength of current flowing through the conductor to afford a substantially accurate measure of the current strength.

My invention is not, however, limited to the use of short strips, as it is a distinctly novel feature of my invention to use as a means of measuring strength of current flow, the difference in temperature between portions of a conductor of any length heated by the current, using when necessary an auxiliary means for compensating for the effect upon this difference in temperature, produced by the amount of heat lost by radiation and convection.

To correct for the error produced by the small amount of heat directly dissipated into the air, and also for the error produced by the fact that in general the two terminals will not have the same temperature, owing to differences in contact resistance etc., the compensating feature was devised. This compensation results from the use of a thermal compensating device, whose action is entirely independent of any electrical action, though it may, for convenience, be used as part of the thermo-couple circuit.

This compensating feature consists of one or more strips, the ends of which are in thermal contact with, but electrically insulated from the terminals. Instead of connecting the cold ends of the thermo-couple to the terminal directly, they are connected to the centres of the two strips. These two strips are so proportioned as to their superficial area and cross sectional area that they are influenced by the temperature of the air, and by the difference in temperature between the terminals to the same amount as is the active or heating strip. In practice the compensating heat conductor is most conveniently made in the form of a strip, but this form is not essential as the same function will obviously be performed if the conductor is made in the form of a rod, wire, bar or plate.

The method by which this compensation is effected is best considered when no current is passing. Assume first that the temperatures of the two terminals and of the air are the same. It follows that the temperature of the centre of the active or heating strip is the same as that of the centre of the compensating strips, the temperature being uniform through the system, therefore when no current passes, no thermo-electromotive force is generated and the instrument indicates zero as it should. When current passes therefore, the indication of the instrument is dependent upon the current only and not on surrounding influences.

Second, assume the two terminals to have the same temperature, but that the temperature of the air is lower than that of the terminals. Then the middle of the heating strip, when no current is passing, will have its temperature depressed below that of the terminals due by the cooling by the air. If this were not compensated, it would produce an indication on the indicating instrument when no current was passing, and an error if current were passing. The compensating strips, which are subjected to the same cooling influence, are also depressed in temperature at their centres by the same amount as the heating strip, which maintains the temperatures of the "hot" and "cold" ends of the thermo-couple alike and produces no indication when no current passes, and no error when current is passing.

Assume third, that, the two terminals have different temperatures and that the air temperature for simplicity is at the mean temperature between the terminal temperature. Then there will be a transfer of heat from the terminal having the higher temperature to that having the lower, through the compensating strips and through the heating strip. This causes a change in temperature in the compensating strips equal to that in the heating strip, since, as stated above the strips are designed to be thermally equivalent. Therefore no instrument indication is produced with no current passing and no error is produced with current passing, the difference in temperature in the thermocouple being a function of the current only.

Furthermore, if the temperature of the surrounding air had any other temperature than that assumed, it would either depress or elevate by the same amount the temperature of the compensating strips and heating strip and maintain both ends of the couple at the same temperature when no current passes, causing no indication on the indicating instrument, and preventing error when current passes.

The compensating device therefore corrects for all conditions of external influence met with in practice and renders the indications of the instrument independent of the time it has been in circuit, or of the temperature of the surrounding air, or of the temperatures of the terminals.

Moreover, the compensating device operates correctly for either a long or short strip, that is it is independent, for conditions met with in practice, of the relative proportions of the amount of heat dissipated by convection or conduction, for the reason that whatever the length, the two sets of strips are made thermally equivalent.

Considering these conditions analytically it can be shown in the general case where the strip is subject both to conduction and convection that the temperature at the centre of the heating strip above that of the surrounding air is $$T_2 = \theta - m\theta + mT_1$$

where $\theta$ = the temperature above air, the strip would have if all heat were dissipated by convection; $T_1$ is the temperature of the terminal above that of the surrounding air, and $m$ is a function of the form of the strip and the convection coefficient, its actual value being $$M = \frac{2}{e^{l\sqrt{\frac{sc}{ak}}} + e^{-l\sqrt{\frac{sc}{ak}}}}$$

where $l$ = one-half length of the heating strip, "$c$" is the convection coefficient, "$k$" is the thermal conductivity, "$a$" is the cross-sectional area, "$e$" is the base of natural logarithms, and "$s$" is the superficial area of the strip per unit length.

It can further be shown, that the temperature at the centre of the compensating strip above that of the surrounding air is $$T_0 = mT_1$$

so that the difference in temperature between the centre of the heating strip and that of the compensating strip, which is the difference producing the thermo-electromotive force, is $$T_2 - T_0 = \theta - m\theta = \theta(l-m).$$

Since $m$ is a constant for any particular instrument and calibration, the thermo-electromotive force varies with $\theta$ only, which depends only upon the heat produced by the current. Therefore the compensating feature is in general correct for any length of heating strip and is a true correcting device.

As stated in a previous description, theoretically the compensating strips, if made of the same material as the heating strip, should have also exactly the same form and size as those of the heating strip to compensate for both permanent differences in the external temperature influences and for errors produced during the time when changes occur. If they are not made of the same material, they must be proportioned according to their heat conductivities and specific heat so as to preserve thermal equivalence including equivalence in heat capacity so that not only are they equally affected by external temperatures, but also at the same rate.

In practice, the changes occur so slowly, and the construction of the heating element is such that the heat capacities of the compensating and heating strips are so nearly of the same order of magnitude, that it is not necessary in general to consider these transient effects, but only to design the element for equality of permanent thermal condition. For purposes of design therefore, it is convenient to make the compensating strips longer than the heating strips and of a cheaper material, such as copper, and bridge them across the terminal ends. Where the term "thermal equivalent" appears in the claims it must be understood in the sense in which it is used in the above discussion.

In order that the compensating and heating strips shall be equally influenced by the terminal temperature, and by the air temperature it can be shown that the quantity $\frac{l^2 s}{ak}$ must be the same for both, where $l$ = length of the strip.
$s$ = superficial area of strip per unit length.
$a$ = cross sectional area of strip.
$k$ = thermal conductivity of material.

The proper values for the various strips can, however, be determined experimentally with little difficulty.

Another modification of this compensation method can be used if the two terminals are maintained at the same temperature either by being directly in good thermal contact, or by both being in good thermal contact with a relatively large mass of heat conducting material which equalizes the temperatures in the two terminals. The compensating wires or strips in this case need be in thermal contact with only one of the terminals, or with the common equalizing heat conductor, and extend into the air to a distance such that they are thermally equivalent to the part of the heating wire or strip from the terminal to the centre of the strip where the hot junction of the thermo-couple is connected.

This form of instrument is shown in Fig. 14, in which the terminals are shown as electrically insulated but in good heat connection, as by a sheet $C^1$, of thin mica, with a block D of metal or other good heat conductor. The compensating strips 4′, 5′, need not in this case bridge the terminals, and are shown as extending outwardly from the terminal B′. They are made thermally equivalent to the corresponding portion of the heating strip.

In Fig. 15 is shown another modification in which the terminals B, B′ are superposed with a thin layer $C^2$ of mica between them, by which they are electrically insulated from each other, but are in good thermal connection. The heating strip $S^2$ is curved to extend between the ends of the terminals. The compensating strips 4″, 5″, which extend outwardly from the terminal B′ are made thermally equivalent to the portion of the strip between the hot junction and the upper terminal.

In the heating element thus far described, the cold ends of the thermo-couple have been both in direct electrical and thermal contact with the compensating strips, which were used therefore for the dual purpose of conducting heat and the electric current. I do not limit myself, however, to this construction, for the thermal-couple may be in thermal contact with the compensating strips but electrically insulated from them, and the thermo-couple connected to the indicating instrument by means of suitable independent conductors as is illustrated in Fig. 16, in which 18 and 19 are thin sheets of mica or other electrical insulating material, and 20 and 21 are suitable cold end terminal conductors in good thermal contact with the compensating strips but electrically insulated from them by means of insulating sheets.

The important features of my invention consist therefore in:

(1.) The application of a new principle to thermal-ammeters, by which the heat produced by the current is transmitted through the body of the conductor carrying the current to the terminals, producing a drop in temperature in the conductor between its centre and its ends because of its thermal resistance (which is equal to the reciprocal of its thermal conductivity). This drop or difference in temperature is, as has been shown above, proportional to the square of the current strength and is utilized in producing a corresponding electromotive force in a thermo-electric couple or battery connected to the proper points and to an indicating instrument.

(2.) The use of a short heating strip having a small mass and, therefore, of small heat capacity in good thermal contact with terminals to which the heat as generated is transferred at a very high rate, causes the temperature of the heating strip to vary with the heat generated at a correspondingly high rate. As a result, the instrument indications are quickly responsive to changes in current in the heating strip.

(3.) Owing to the possibility of the close proximity of the "hot" and "cold" ends of the thermo-couple, they are subjected to the same external influences, and can readily be compensated for errors produced by them.

(4.) The compensating feature, by which the indications of the instrument are made independent of the surrounding air temperature, of the temperature, or equality of temperature of the terminals, or of the gradual heating of the entire element by the current passing.

(5.) The use of a short thermo-couple permits the use of thin wires, without unduly increasing the electrical resistance. This makes possible the use of a rugged form of switchboard indicating instrument instead of a delicate pyrometer milli-volt meter. In practice, milli-voltmeters of the pivoted coil type are used. Moreover the thin wires of the thermo-couple have such a low heat capacity that they quickly follow changes of temperature in the heating strip, so that the indicating instrument quickly responds to any changes in current flow through the heating strip.

(6.) The new principle of using the heat conductivity of a standard material as a means of producing the measuring drop in temperature instead of the usual method of depending upon the temperature as determined by the convection of heat into the air, permits the use of a short heating strip, which reduces the voltage drop, and consequently the heat produced, to a minimum, which in turn makes it possible to make the heating element very much smaller than is the case with the usual form of instrument, in which the drop is 5 to 6 times as great as in the present form of thermal-ammeter. This of course permits making the instruments of high range without abnormally increasing the dimensions.

(7.) On account of small influence of the surrounding air, the heating element may be used in any position without introducing serious error, whereas the form of instrument with air cooled heating strips must be used in one position only.

(8.) With the present form of thermal-ammeter the heating element may be connected in the circuit at the most convenient location, and the indicating instrument placed in another position on the switchboard and connected to the element by means of leading wires, in a similar manner to a direct current shunt; or, if desired, the two may be combined in one structure.

(9.) On account of the very high current density which can be attained by the use of a short heating strip cooled by conduction to massive terminals, the entire current to be measured, for most ranges, can be passed through one heating strip, thus eliminating serious errors due to unequal distribution of currents of high frequency in that form of thermal-ammeter or expansion type ammeter, in which the current passes through a number of conductors in multiple. If the several strips do not have exactly the same resistance and self inductance, which is very difficult to obtain in practice, then the aforesaid instruments will give erroneous indications when used on high frequencies.

I do not limit myself to any particular length of the heating strip. It may be very short, in which case practically all of the heat is conducted away through the terminals, and the temperature difference which is the measure of the current is that between a heated portion of the strip and the terminals, provided the two terminals have the same temperature, and the function of the cold-end compensating strip then is, for all practical purposes, to give the cold-end of the couple the mean temperature between the two terminals if their temperatures are unequal. Or, the heating strip may be relatively very long, in which case practically all the heat is carried away by convection by the air or radiation to surrounding parts, and the function of the cold-end strips is to compensate for variation in the temperature of the air and contiguous parts.

These are merely limiting conditions. The compensating strips have in general the combined function of correction for heat conduction, convection and radiation.

It is desirable to enclose the active portion of the apparatus in a closed chamber, to prevent effect of external air currents affecting the strips unequally.

I also do not limit the heating element to a single strip. Any number of strips may be used, provided they are properly spaced according to well known methods to give equal distribution for currents of any frequency.

Neither do I limit the number of thermoelectric couples on the heated resistor to one, nor the number of compensating conductors to two. Thus a number of thermo-couples might have their hot junctions in thermal connection with the heated resistor, and their cold junctions in thermal connection with one or more compensating strips, the thermo-couples being connected in the usual series connection to afford additional electromotive force for actuation of the indicating device.

Such a construction is shown in Figure 17 which is a cross section through the heating and compensating device. The thermo-couples 2.3; 2'.3'; 2".3"; etc., have their hot ends thermally connected to the heating conductor S, and their cold junctions electrically connected in series and in thermal connection with the compensating device 45. This thermal connection may be made in the same way as previously described namely, by thin pieces of mica 45' and 45". The outside terminals of the series are connected to the indicating instrument. The compensating device is, as before described, in good thermal connection with a terminal or terminals, such terminal being shown as $T^3$.

When a plurality of heating strips and a plurality of compensating strips are used, the arrangement shown in Figs. 18 and 19 may be used, the plurality of thermo-electric devices being arranged to give equal distribution of current for any frequency. In this form of device, a number of thermocouples, four are shown, are used. In these figures the respective sets of terminals T and T' are mounted in any suitable manner as on the main terminals $T^{20}$, $T^{21}$. Each device has, as before, a heating strip S, to which the thermo-couple wires 2, 3 are thermally connected by thin pieces of mica 45', as previously described. The cold ends of the thermo-couple are connected to the compensating strips 4 and 5, which are in thermal connection with the terminals by means of pieces of mica 45".

The couples of all the terminals are connected in series by means of the conductors $49^a$, $49^b$, and $49^c$, and to the indicating instrument V by conductors $49^d$ and $49^e$. The main terminals are mechanically supported in any suitable manner. Moreover, I may place the heated resistor or resistors and their corresponding compensating conductors in a vacuum to diminish the amount of heat lost by convection and correspondingly increase that lost by conduction through the resistor to produce a greater temperature difference.

Neither do I limit myself to the use of an indicating milli-volt meter to indicate or measure the electromotive force generated in the thermo-electric couple, but I may use any other means to measure it, such as, for instance, by balancing it against a known opposed electromotive force from an external source, as with a potentiometer, which method would be suitable in some scientific investigation where great precision is desired.

By the term "heating strip", as used in the specification and claims is meant any suitable form of conductor, in which sufficient heat for the purposes desired will be generated by passage of current therethrough. It is further obvious that all the conections of the compensating device with the terminals need not be electrically insulated as long as there results from such omission of insulation, no continuous electrical circuit to alter the circuit to the indicating instrument or to shunt the heating strip.

I claim:—

1. A thermal-ammeter comprising terminals, a short heating strip connected to the terminals and a thermo-couple having its hot junction thermally connected to the hot wire or strip and its cold ends in thermal connection with but electrically insulated from a terminal.

2. A thermal-ammeter comprising terminals, a short heating strip connected to the terminals, cold-end compensating strips, thermally equivalent to said heating strip, in thermal connection with but electrically insulated from a terminal or terminals and a thermo-couple having its hot junction thermally connected to the heating strip and its cold ends in direct electrical and thermal contact with said compensating strips.

3. A thermal-ammeter comprising terminals, a short heating strip connected to the terminals and a thermo-couple having its hot junction thermally connected to the heating strip and its cold ends in thermal connection with but electrically insulated from a terminal, and a casing surrounding the terminals and heating strip.

4. A thermal-ammeter comprising terminals, a short heating strip connected to the terminals, thermally equivalent cold-end compensating strips in thermal connection with, but electrically insulated from said terminals, and a thermo-couple having its hot junction thermally connected to the heating strip and its cold ends in direct electrical and thermal contact with said compensating strips, and a casing surrounding the compensating strips and heating strip.

5. A thermal-ammeter comprising terminals, a short heating strip connected to the terminals, thermally equivalent cold-end compensating strips in thermal connection with, but electrically insulated from said terminals, and a thermo-couple having its hot junction thermally connected to the heating strip and its cold ends in thermal contact with said compensating strips, and a casing surrounding the compensating strips and heating strip.

6. A thermal-ammeter comprising terminals, a heating strip connected to the terminals, thermally equivalent cold-end compensating strips in thermal connection with, but electrically insulated from said terminals and a thermo-couple having its hot junction thermally connected to the heating strip and its cold ends in direct electrical and thermal contact with said compensating strips.

7. A thermal-ammeter comprising terminals, a heating strip connected to the terminals, thermally equivalent cold-end compensating strips in thermal connection with, but electrically insulated from said terminals and a thermo-couple having its hot junction thermally connected to the heating strip and its cold ends in thermal contact with said compensating strips.

8. A thermal-ammeter comprising terminals, a heating conductor connected to the terminals, heated by the current, and a thermo-electric couple having its hot junction in thermal connection with the heating conductor and its cold ends in direct thermal connection with at least one terminal, and a casing surrounding the terminals and heating conductor.

9. A thermal-ammeter comprising terminals, thermal conducting means in thermal connection with said terminals, a conductor heated by the current connected to said terminals, and a thermo-electric couple having its hot junction in thermal connection with a portion of the heating conductor and its cold ends in direct thermal connection with said thermal conducting means, and a casing surrounding the terminals, thermal conducting means and heating conductors.

10. A thermal-ammeter comprising terminals, a heating strip connected to the terminals, thermally equivalent cold-end compensating strips in thermal connection with, but electrically insulated from said terminals and a thermo-couple having its junction thermally connected to the heating strip and its cold ends connected to said compensating strips, and a casing surrounding the compensating strips and heating strip.

11. A thermal-ammeter comprising terminals, a short heating strip having its ends connected to the terminals and a thermo-electric couple having its hot junction thermally connected to the central portion of the heating strip and its cold ends thermally connected but electrically insulated from the ends of the heating strip.

12. A thermal-ammeter comprising terminals, a short heating strip having its ends connected to the terminals and a thermo-electric couple having its hot junction thermally connected to a hot portion of the heating strip and its cold ends thermally connected to but electrically insulated from a cooler portion of the heating strip.

13. A thermal-ammeter comprising terminals, a short heating strip having its ends connected to the terminals and a thermo-electric couple having its hot junction thermally connected to a hot portion of the heating strip and its cold ends thermally connected to but electrically insulated from a cooler portion of the heating strip in close proximity to the hot junction.

14. A thermal-ammeter comprising terminals, a short heating strip of relatively low resistance connected to the terminals and a thermo-couple having its hot junction thermally connected to the heating strip and its cold ends in thermal contact with but electrically insulated from a terminal.

15. A thermal-ammeter comprising terminals, a short heating strip of relatively low electrical resistance and of small heat capacity connected to the terminals; and a thermo-couple of small heat capacity having its hot junction thermally connected to the heating strip and its cold ends in thermal contact with but electrically insulated from a terminal.

16. A thermal-ammeter comprising terminals, a short heating strip of relatively low electrical resistance and of small heat capacity connected to the terminals; and a thermo-couple of small heat capacity having its hot junction thermally connected to the heating strip.

17. A thermal-ammeter comprising terminals, a short heating strip of relatively low electrical resistance and of small heat capacity connected to the terminals; cold-end compensating strips thermally connecting the terminals; and a thermo-couple of small heat capacity having its junction thermally connected to the heating strip and its cold ends in thermal contact with said compensating strips.

18. A thermal-ammeter comprising terminals, a short heating strip of relatively low electrical resistance and of small heat capacity connected to the terminals; cold-end compensating strips thermally connecting the terminals; and a thermo-couple of small heat capacity having its junction thermally connected to the heating strip and its cold ends in direct electrical and thermal contact with said compensating strips.

19. A thermal-ammeter comprising thermally-connected, but electrically-insulated terminals, a short heating strip connected between said terminals; cold-end compensating strips, thermally equivalent to said heating strip, in thermal connection with but electrically insulated from said terminals; and a thermo-couple having its hot junction thermally connected to the heating strip and its cold ends in direct electrical and thermal contact with said compensating strips.

20. A thermal-ammeter comprising a heating strip connected to terminals, and a thermo-couple having its hot junction thermally connected to the heating strip, compensating strips in thermal connection with but electrically insulated from said terminals, to which compensating strips the cold ends of the thermo-couple are connected at points between which and a terminal are lengths of free compensating strip thermally equivalent to a corresponding portion of the heating strip.

21. A thermal-ammeter comprising terminals, a heating strip connected to the terminals, a thermal compensating device in thermal connection with said terminals, and a thermo-couple having its hot junction thermally connected to the heating strip and its cold ends in thermal connection with said compensating device.

22. In a thermal-ammeter, the combination of a thin heating strip, massive terminals and means for making good thermal and electrical contact between the strip and the terminals, said means comprising short and relatively massive conductors, and hard solder unions between the strip and the conductors and between the conductors and the terminals.

23. In a thermal-ammeter, the combination of a thin heating strip, massive terminals and means for making good thermal and electrical contact between the strip and the terminals, said means comprising short conductors more massive than the strip, but less massive than the terminals, and connections of relatively low thermal and electrical resistance between the strip and the conductors, and the conductors and the terminals.

24. A thermal-ammeter comprising terminals, a heating strip connected to the terminals, and a plurality of electrically connected thermo-couples having their hot junctions thermally connected to the heating strip and their cold junctions in thermal connection with one of the terminals.

25. In a thermal-ammeter including terminals, a heating strip connected to the terminals, one or more thermo-couples having their hot junctions in thermal connection with said heating strip, a compensating device with which the cold junctions of the thermo-couples are in thermal connection, for maintaining the temperature difference between the hot and cold junctions of the said thermo-couples independent of the temperatures of the terminals or of the temperatures of the surrounding medium.

26. In a thermal-ammeter including terminals, a heating strip connected to the terminals, one or more thermo-couples having their hot junctions in thermal connection with said heating strip, a compensating device in thermal connection with the said terminals and the surrounding medium, with which compensating device the cold junctions of the thermo-couples are in thermal connection, for maintaining the temperature difference between the hot and cold junctions of the said thermo-couples independent of the temperatures of the terminals or of the temperatures of the surrounding medium.

27. A thermal-ammeter comprising terminals, a heating strip connected to the terminals a plurality of electrically connected thermo-couples having their hot junctions thermally connected to the heating strip, a strip compensating device in thermal connection with said terminals and the cold junctions of the thermo-couples in such manner that between the terminals and the cold junctions are lengths of free compensating strip thermally equivalent to corresponding portions of the heating strip.

28. A thermal-ammeter comprising terminals, a heating strip connected to the terminals, a thermal compensating device in thermal connection with said terminals, and a thermo-couple having its hot junction thermally connected to the heating strip and its cold ends in thermal connection with said compensating device.

29. A thermal-ammeter comprising terminals, a heating strip connected to the terminals, a thermal compensating device in thermal connection with said terminals, and a plurality of electrically connected thermo-couples having their hot junctions in thermal connection with the heating strip and their cold junctions in thermal connection with said compensating device.

30. A thermal-ammeter comprising terminals, a heating strip having its ends connected to the terminals and a plurality of electrically connected thermo-couples having their hot junctions thermally connected to a hot portion of the heating strip and their cold junctions thermally connected to a cooler portion of the heating strip.

31. A thermal-ammeter comprising terminals, a plurality of electrically and thermally equivalent heating strips connected to the terminals, a cold end thermal compensating device in thermal connection with said terminals and a thermo-couple having its hot junction in thermal connection with one of the heating strips, and its cold ends in thermal connection with said compensating device.

32. A thermal-ammeter comprising terminals, a plurality of heating strips connected to the terminals, a cold end compensating device in thermal connection with said terminals and a plurality of electrically connected thermo-couples having their hot junctions in thermal connection with one of the heating strips and their cold junctions in thermal connection with said compensating device.

33. A thermal-ammeter comprising terminals, a plurality of heating strips connected to the terminals, a cold end compensating device in thermal connection with said terminals, a plurality of electrically connected thermo-couples, the hot junctions of which are each in thermal connection with a heating strip and their cold junctions in thermal connection with said compensating device.

34. A thermal-ammeter comprising terminals, a plurality of heating strips connected to the terminals, cold end compensating strips in thermal connection with said terminals, and a plurality of electrically connected thermo-couples, the hot junctions of which are each in thermal connection with a heating strip and their cold junctions each in thermal connection with a compensating strip.

35. In an electrical measuring instrument, terminal conductors for the current, a conductor in which temperature varies in accordance with the strength of current passing therethrough and connected to said conductors, and a thermo-electric couple located to have the temperature of one portion correspond with the temperature of said conductor and the temperature of another portion correspond with the temperature of at least one of said first named conductors by direct thermal relation therewith.

36. In an electrical measuring instrument, means for conducting the current to be measured comprising a portion whose temperature varies in accordance with the strength of current passing therethrough, and a thermo-electric couple having one part subjected to heating effect derived from the change in temperature of said portion and having another part of the couple in direct thermal relation with a portion of said conducting means whose temperature does not vary in accordance with the strength of current passing therethrough.

37. In an electrical measuring instrument, terminals, a conductor extending between them and in which temperature varies in accordance with the strength of current therethrough, a thermo-electric couple having a part subjected to heating effect derived from the change in temperature of said conductor and corresponding in change of temperature therewith, and means for causing another part of said couple to correspond in temperature with the temperature of at least one of said terminals by direct thermal relation therewith.

38. In an electrical measuring instrument, means for conducting the current to be measured, and a thermo-electric couple having its joint subjected to the influence of temperature changes in one portion of said conducting means and having another part of said couple subjected to the influence of temperature changes in another portion of said conducting means by direct thermal relation therewith.

39. In an electrical measuring instrument, terminal blocks, a conductor between said blocks in which temperature varies in accordance with the strength of current passing therethrough, a thermo-electric couple having its joint subjected to the influence of temperature changes in said conductor, and contacting means for causing the temperature of another part of said couple to correspond with the temperature of at least one of said blocks.

40. In an electrical measuring instrument, terminals, conducting means between said terminals in which temperature varies in accordance with the strength of the current passing therethrough, a plurality of thermo-electric couples having their joints subjected to and corresponding with the change in temperature of said conducting means, and contacting means for subjecting other portions of said couples to the temperature of said terminals.

41. In an electrical measuring instrument, terminals, a conductor between said terminals in which the temperature varies in accordance with the strength of current passed therethrough, a thermo-electric couple having a portion in intimate thermal relation with said conductor, and supporting means for other portions of said couple, said supporting means being in direct thermal relation with at least one of said terminals.

42. A thermal-ammeter comprising terminals, thermal conducting means in thermal connection with said terminals, a conductor heated by the current connected to said terminals, and a thermo electric couple having its hot junction in thermal connection with a portion of the heating conductor and its cold ends in direct thermal connection with said thermal conducting means.

43. A thermal-ammeter comprising terminals, thermal conducting means in thermal connection with at least one of said terminals, a conductor heated by the current connected to said terminals, and a thermo electric couple having its hot junction in thermal connection with a portion of the heating conductor and its cold ends in direct thermal connection with said thermal conducting means.

44. A thermal-ammeter comprising terminals, a conductor heated by the current connected to the terminals, thermal conducting means in thermal connection with at least one of said terminals and at least one thermo couple having its junction subjected to the influence of temperature changes in said conductor and means for causing temperature of another part of said couple to correspond with the temperature of said thermal conducting means by direct thermal relation therewith.

45. A thermal-ammeter comprising terminals, one or more heating conductors heated by the current to be measured connected thereto, thermal conducting means in thermal connection with at least one terminal, means for indicating the difference in temperature between a hot portion of at least one heating conductor and the said thermal conducting means, as a measure of the current strength.

46. A thermal-ammeter comprising terminals, a conductor heated by the current connected to the terminals, means for equalizing the temperatures of the two terminals, thermal conducting means in thermal connection with at least one terminal and a thermoelectric couple having its hot junction in thermal connection with the heating conductor and means for causing its cold ends to correspond in temperature with the temperature of said thermal conducting means by direct thermal relation therewith.

47. A thermal-ammeter comprising terminals, a conductor heated by the current connected to the terminals, means for equalizing the temperatures of the terminals and a thermocouple having its hot junction in thermal connection with the heating conductor and means causing its cold ends to correspond in temperature with the temperature of at least one of said terminals by direct thermal relation therewith.

48. A thermal-ammeter comprising heat absorbing means, a conductor to be heated by the current in thermal connection with said heat absorbing means, said conductor being so proportioned that a considerable portion of the heat generated is conducted through the body of the conductor to the heat absorbing means, and means including a thermo couple for determining as a measure of the current flow the difference in temperature between a portion of the conductor and the heat absorbing means.

49. A thermal-ammeter comprising a conductor arranged to be heated by the current, said conductor being so proportioned that a considerable portion of the generated heat flows therethrough and means for determining as a measure of current flow the difference in temperature between a hot portion and a cooler portion of said conductor.

50. A thermal-ammeter as claimed in claim 48 in which the temperature determining means includes a thermo-couple having its hot junction thermally connected to a hot portion of the conductor and means for causing its cold ends to correspond in temperature with the temperature of a cooler portion.

51. A thermal-ammeter comprising terminals, a heating conductor having its ends connected to the terminals, said heating conductor being so proportioned that a considerable portion of the generated heat flows therethrough, a thermo-couple having its hot junction thermally connected to a hot portion of the heating strip and its cold ends thermally connected to a cooler portion of the heating strip and a pivoted coil indicating instrument in the thermo electric circuit.

52. A thermal ammeter comprising terminals; a heating conductor heated by the passage of the current and connected to the terminals; a thermal conducting means exposed to the air surrounding the terminals and heating conductors, and in thermal connection with at least one of the terminals; means for indicating the difference in temperature, as a measure of the current, between the heating conductor and a point on the said thermal conducting means, the thermal conducting means being, between said point and the terminal, thermally equivalent to a corresponding portion of the heating conductor.

53. A thermal ammeter comprising terminals; a heating conductor heated by the passage of the current and connected to the terminals; a thermo-electric couple having its hot junction thermally connected to the heating conductor, and its cold ends exposed to the air surrounding the terminals and heating conductor, and in thermal connection with at least one terminal through thermal conducting means which are thermally equivalent to a corresponding portion of the heating conductor.

54. In a thermo-ammeter including terminals, a heating strip connected to the terminals, one or more thermo-couples having their hot junctions in thermal connection with said heating strip, a compensating device with which the cold junctions of the thermo-couples are in thermal connection, for maintaining the temperature difference between the hot and cold junctions of the said thermo-couples independent of the temperatures of the terminals or of the temperatures of the surrounding medium.

In testimony whereof I affix my signature in presence of two witnesses.

WILLIAM NELSON GOODWIN, JR.

Witnesses:
    Jos. A. DONIAN,
    WM. F. TURNER.